United States Patent
Skorucak

(10) Patent No.: US 8,376,368 B2
(45) Date of Patent: Feb. 19, 2013

(54) SEALING DEVICE FOR A ROTATING MACHINE

(75) Inventor: Bela Skorucak, Cormeilles en Parisis (FR)

(73) Assignee: Thales, Neuilly sur Seine Cedex (FR)

( * ) Notice: Subject to any disclaimer, the term of this patent is extended or adjusted under 35 U.S.C. 154(b) by 544 days.

(21) Appl. No.: 11/572,206

(22) PCT Filed: Jul. 4, 2005

(86) PCT No.: PCT/EP2005/053172
§ 371 (c)(1),
(2), (4) Date: Aug. 20, 2007

(87) PCT Pub. No.: WO2006/008232
PCT Pub. Date: Jan. 26, 2006

(65) Prior Publication Data
US 2008/0093805 A1    Apr. 24, 2008

(30) Foreign Application Priority Data
Jul. 16, 2004 (FR) .................................. 04 07927

(51) Int. Cl.
*F16J 15/00* (2006.01)
(52) U.S. Cl. ...................................................... 277/412
(58) Field of Classification Search ............... 277/411, 277/412, 418, 419, 420
See application file for complete search history.

(56) References Cited

U.S. PATENT DOCUMENTS

| | | | | | |
|---|---|---|---|---|---|
| 2,198,782 | A | * | 4/1940 | May | 277/347 |
| 2,643,141 | A | * | 6/1953 | Bryant | 277/637 |
| 2,891,808 | A | * | 6/1959 | Richardson | 277/412 |
| 3,630,529 | A | | 12/1971 | Ball | |
| 3,880,434 | A | * | 4/1975 | Echard et al. | 277/348 |
| 4,199,154 | A | * | 4/1980 | Mueller | 277/420 |
| 4,335,885 | A | * | 6/1982 | Heshmat | 277/347 |
| 5,038,631 | A | | 8/1991 | Renk et al. | |
| 6,155,574 | A | * | 12/2000 | Borgstrom et al. | 277/419 |
| 6,343,794 | B1 | | 2/2002 | Brown | |
| 7,430,802 | B2 | * | 10/2008 | Tiemann | 29/889.22 |

FOREIGN PATENT DOCUMENTS
JP      55017722    2/1980

* cited by examiner

*Primary Examiner* — Gilbert Lee
(74) *Attorney, Agent, or Firm* — Lowe Hauptman Ham & Berner, LLP

(57) ABSTRACT

A sealing device for a rotating machine includes a shaft rotating with respect to a housing containing a fluid. The sealing is provided between the shaft and the housing. The sealing device includes a first labyrinth arranged between the shaft and the housing, fins secured to the shaft and arranged in the first labyrinth, the fins being intended to discharge the fluid entering the first labyrinth toward the inside of the housing. The sealing device makes it possible to prevent any leak of fluid without friction at the junction between the shaft and the housing.

16 Claims, 3 Drawing Sheets

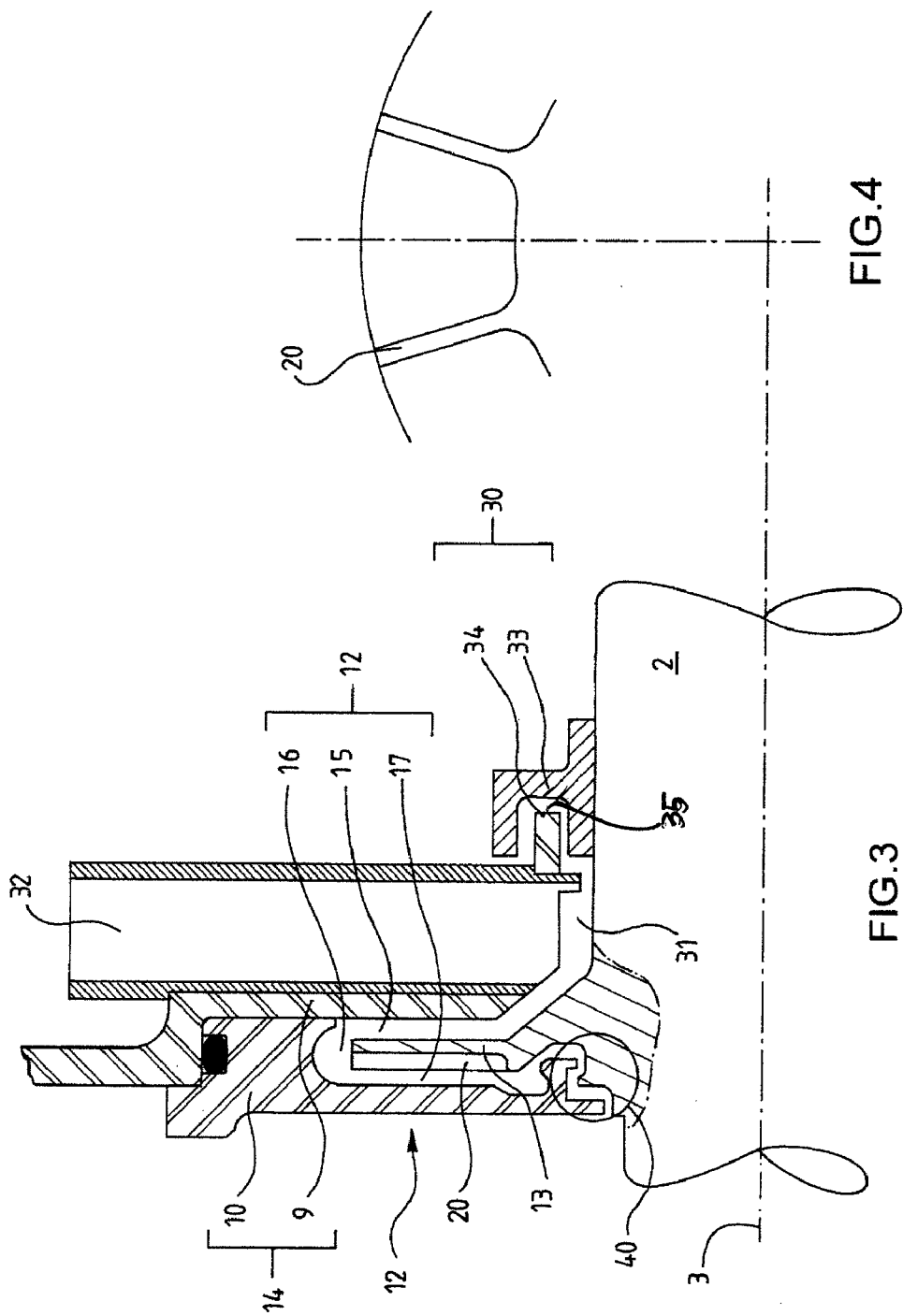

SEALING DEVICE FOR A ROTATING MACHINE

RELATED APPLICATIONS

The present Application is based on International Application No. PCT/EP2005/053172, filed on Jul. 4, 2005, which in turn corresponds to FRNACE Application No. Number 04 07927, filed Jul. 16, 2004, and priority is hereby claimed under 35 USC §119 based on these applications. Each of these applications are hereby incorporated by reference in their entirety into the present application.

FIELD OF THE INVENTION

The invention relates to a sealing device for a rotating machine comprising a shaft rotating with respect to a housing. The invention will be described in relation to an electric machine, motor or generator, allowing the conversion of electrical energy into mechanical energy, or vice-versa. The mechanical energy is conveyed by the rotation of the shaft. It goes without saying that the invention is not limited to an electric machine and that it can be implemented for example to provide sealing for any machine in which a shaft rotates with respect to a housing, such as an internal combustion engine or a gearbox, for example.

BACKGROUND OF THE INVENTION

In the case of an electric machine, the conversion of energy generates heat losses which have to be dissipated. When the power of the electric machine is high, specific cooling means are provided that make use, for example, of the flow of a heat-transfer fluid such as oil, for example. The bottom part of the housing forms a reservoir from which the fluid is pumped so as to circulate in parts of the electric machine that are to be cooled. Stator and rotor windings form the parts to be cooled, for example. After flowing through these windings, the fluid returns to the bottom part of the housing in order to remove the heat that it conveys for example by convection against the wall of the housing or into an exchanger provided for this purpose.

It is important to keep the fluid inside the housing and to prevent leaks. To make this possible, it is necessary to provide sealing for the elements situated inside the housing with respect to the outside. The invention relates more particularly to sealing the shaft with respect to the housing. This sealing is difficult to implement on account of the interface between a moving element, in this instance the shaft, and a fixed element, namely the housing.

SUMMARY OF THE INVENTION

One solution consists in providing a seal fastened to the fixed element and frictionally engaged with the moving element. To this end, use has been made of packing glands or lip seals. This solution has drawbacks. The friction of the seal results in seal wear and a loss of efficiency.

Another solution consists in providing a narrow passage between the fixed element and the moving element. This solution eliminates the friction between the fixed element and the moving element. Nevertheless, the sealing is not perfect and it gives rise to fluid losses which have to be periodically compensated for, resulting in an increased maintenance cost for the machine.

Moreover, it is preferable in the two solutions for the fluid level in the housing to be lower than the seal or the narrow passage. It will be readily understood that a fluid level situated above the seal or above the narrow passage promotes fluid leaks. This constraint poses specific problems when the rotating machine is not used in a fixed position but is mounted, for example, on board an aircraft whose incidence can vary depending on the flight conditions. This is also problematic in the case of a ground vehicle subject to accelerations which, as a result of inertia, lead to variations in the fluid level in the housing.

The object of the invention is to overcome the drawbacks listed above by providing a sealing device between a rotating shaft and a housing, without friction, and guaranteeing the absence of any leak of fluid contained in the housing.

To this end, the subject of the invention is a sealing device for a rotating machine comprising a housing containing a fluid, a shaft rotating with respect to the housing, the sealing being provided between the shaft and the housing, characterized in that it comprises a first labyrinth arranged between the shaft and the housing, fins secured to the shaft and arranged in the first labyrinth, the fins being intended to discharge the fluid entering the first labyrinth toward the inside of the housing.

Tests have shown that even when inclining the rotating machine such that the level of fluid that it contains exceeds the height of the sealing device, no leak was observed during the operation of the rotating machine.

BRIEF DESCRIPTION OF THE DRAWINGS

The invention will be better understood and other advantages will become apparent on reading the detailed description of an embodiment given by way of example, the description being illustrated by the appended drawing, in which:

FIG. 3 is a more detailed representation of a sealing device according to the invention in section in a plane containing the axis of the electric machine; and FIG. 4 represents an example of the form of fins secured to the shaft of the electric machine in section through a plane perpendicular to the plane of FIG. 3.

DETAILED DESCRIPTION OF THE DRAWINGS

Figure 1:
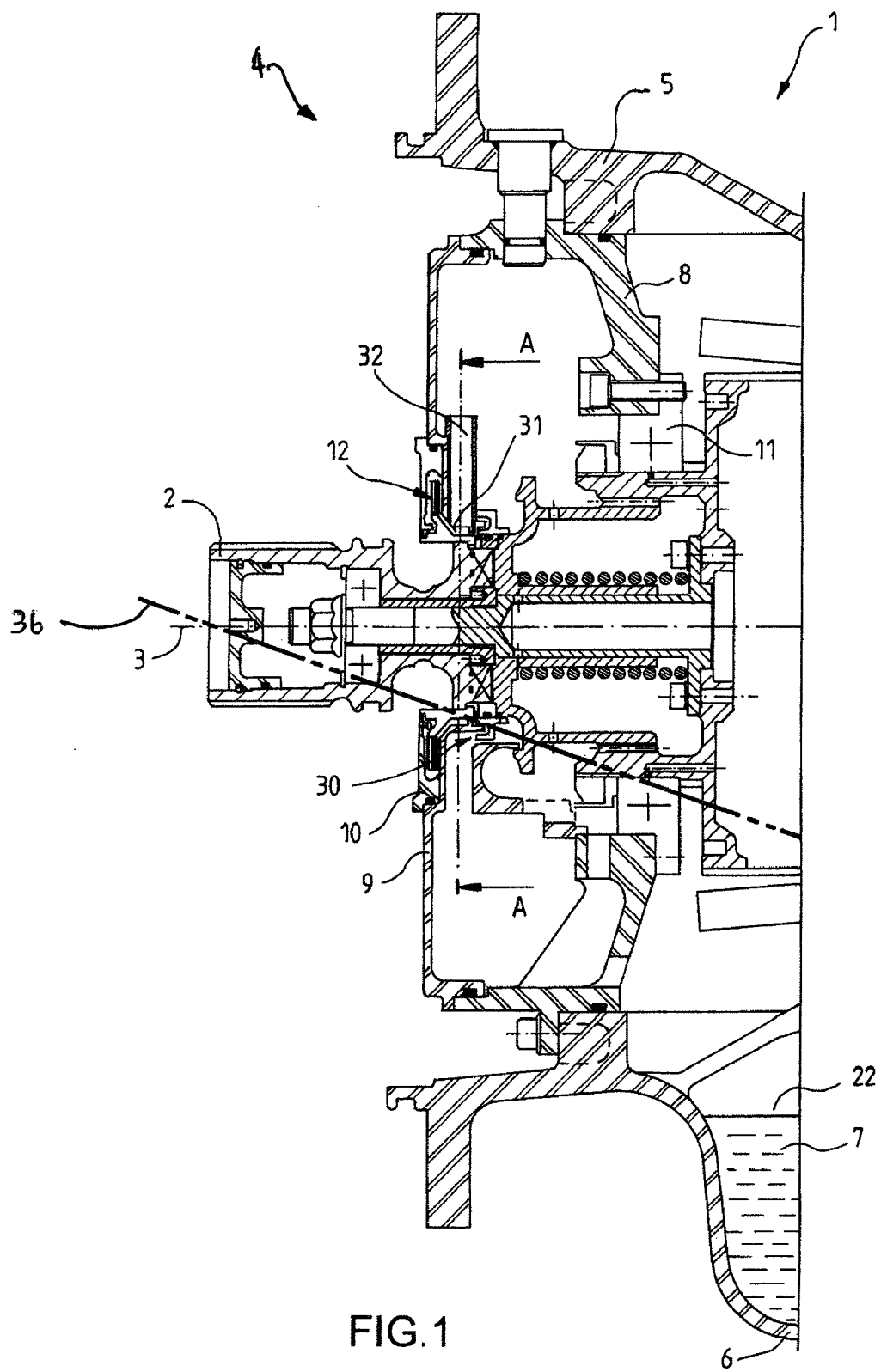
FIG. 1 represents the end of an electric machine in which the invention has been implemented, the representation being provided in section in a plane containing the axis of the electric machine.

FIG. 1 represents the nose of an electric machine 1 comprising a shaft 2 rotating about an axis 3 with respect to a housing 4 formed by a plurality of integral elements: an actual housing 5 whose bottom 6 serves as a reservoir for a fluid 7, a bearing 8, a cover 9, and a cap 10. It goes without saying that the various elements forming the housing 4 are given only by way of example, the number and form thereof depending on functions required of the electric machine 1, these functions being independent of the invention. The bearing 8 has a rolling bearing element 11 enabling the shaft 2 to rotate freely with respect to the housing 4.

The electric machine 1 comprises a sealing device for providing sealing at a junction between the shaft 2 and the housing 4. The sealing device comprises a first labyrinth 12 arranged between the shaft 2 and the housing 4. The labyrinth 12 comprises a moving wall in the form of a disk 13, and a fixed wall 14 secured to the housing 4. The disk 13, of axis 3, is secured to the shaft 2. The fixed wall 14 is formed by the cover 9 and the cap 10. Between the fixed wall 14 and the disk 13 there is a functional clearance defined such that the fixed wall 14 and the disk 13 are not in contact. The labyrinth 12 forms a baffle between the fixed wall 14 and the disk 13. Starting from the upstream end toward the downstream end of any leak of fluid 7 which might escape from the electric machine 1, this baffle is formed by a first ring 15 of axis 3 arranged between the disk 13 and the cover 9, by an annular region 16 situated between the cover 9 and the cap 10 at the periphery of the disk 13, and finally by a second ring 17 of axis 3 arranged between the disk 13 and the cap 10.

The sealing device comprises fins 20 secured to the shaft 2, more precisely to the disk 13. The fins 20 are arranged in the first labyrinth 12 and are intended to discharge the fluid 7 entering the first labyrinth 12 toward the inside of the housing 4. The fins 20 discharge the fluid 7 entering the first ring 15 toward the annular region 16. The fins 20 and the annular region 16 form a centrifugal pump. The fins 20 are, for example, in the form of radial bars secured to the disk 13. The form of the fins is visible in FIG. 4.

Figure 2:
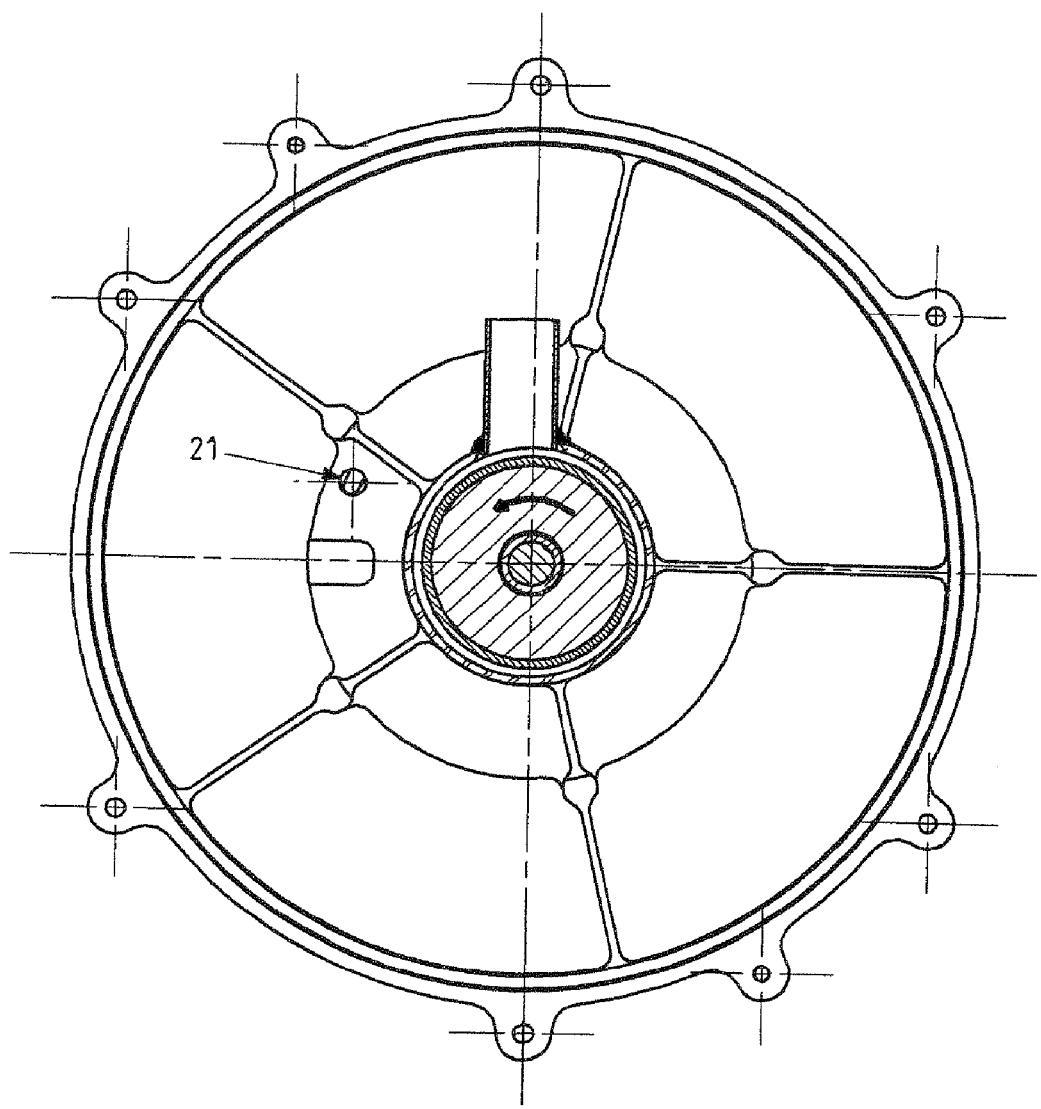
FIG. 2 represents the end of the electric machine in section through a plane perpendicular to the plane of FIG. 1.

Advantageously, the sealing device comprises an orifice 21 for discharging the fluid 7. The discharge orifice 21 is clearly visible in FIG. 2. The discharge orifice 21 is situated in the fixed wall 14 of the first labyrinth 12 in the vicinity of the fins 20. More precisely, the discharge orifice 21 opens between the annular region 16 and the inside of the housing 4 across the cover 9. It is preferably situated in the upper part of the electric machine 1 well above the normal level 22 of the fluid 7, this level being defined when the axis 3 is horizontal and the electric machine 1 is subject to no acceleration.

Advantageously, the sealing device comprises a second labyrinth 30 arranged between the shaft 2 and the housing 4, a cavity 31 arranged between the first labyrinth 12 and the second labyrinth 30, and also a duct 32 allowing air from inside the housing 4 to enter the cavity 31. Starting from the upstream end toward the downstream end of any leak of fluid 7 which might escape from the electric machine 1, the fluid 7 first of all passes through the labyrinth 30, then through the cavity 31 and finally through the labyrinth 12.

The labyrinth 30 comprises a moving wall 33 secured to the shaft 2 and a fixed wall 34 secured to the cover 9. The fixed wall 34 comprises a groove 35 in the form of a ring of axis 3. The groove 35 opens in the direction of the axis 3. The fixed wall 34 is a cylinder portion of axis 3 entering the groove 35.

Between the fixed wall 34 and the moving wall 33 there is a functional clearance defined such that the fixed wall 34 and the moving wall 33 are not in contact. The labyrinth 30 forms a baffle between the fixed wall 34 and the moving wall 33.

The cavity 31 is rotationally symmetrical about the axis 3. In the flow path of the fluid 7, the labyrinth 30 has a pressure drop greater than that of the cavity 31. In the flow path of the fluid 7, the cavity 31 forms an expansion chamber. The rotation of the fins 20 generates a suction effect in the cavity 31. The difference in pressure drop between the cavity 31 and the labyrinth 30 allows the fins 20 to suck in a large fraction of air and a small quantity of fluid 7. Since air has a density much lower than that of a fluid 7 such as oil, for example, the air flow rate remains moderate. This makes it possible for the discharge orifice 21 not to be obstructed either by air or by the fluid 7.

Tests have been carried out in which the electric machine 1 was inclined such that the level 36 of fluid 7 submerges the inlet of the labyrinth 30. The level 36 is represented in dot-dash line in FIG. 1. In this position, no leak of fluid 7 to outside the electric machine 1 was observed.

Advantageously, the sealing device comprises a baffle 40 arranged between the housing 4, more precisely the cap 10, and the shaft 2. The baffle 40 prevents particles present in the air surrounding the electric machine 1 from entering it. The baffle 40 is situated downstream of the labyrinth 12 in the flow path of any leak of fluid escaping from the electric machine. Specifically, in the case of the electric machine being used on board an aircraft, the pressure of the air surrounding the electric machine 1 changes from approximately 1000 hPa at ground level to, for example, 300 hPa at high altitude. Since the electric machine 1 is not pressurized, air exits from it when the altitude rises and enters it when the altitude drops. The baffle 40 makes it possible to prevent particles accompanying the air entering the electric machine from being sucked in by the fins 20.

The invention claimed is:

1. A sealing device in a rotating machine having a housing for containing a fluid; a shaft rotatable with respect to the housing, the sealing device being provided between the shaft and the housing, said sealing device comprising:
    a first labyrinth arranged between the shaft and the housing,
    fins arranged in the first labyrinth,
    a second labyrinth arranged between the shaft and the housing,
    a cavity arranged between the first labyrinth and the second labyrinth, and
    a duct having a first opening upward toward the inside of the housing and a second opening connected to the cavity for allowing air inside the housing to enter the cavity,
    wherein
    the first labyrinth includes a moving wall secured to the shaft and a fixed wall secured to the housing, and an annular clearance provided between the moving wall and the fixed wall,
    said fins are directly secured to the moving wall for discharging the fluid entering the first labyrinth toward an inside of the housing, and
    said fins and the annular clearance form a centrifugal pump.

2. The device as claimed in claim 1, wherein the fixed wall of the first labyrinth comprises an orifice adjacent to one of the fins for discharging the fluid.

3. The device as claimed in claim 2, wherein said orifice of the fixed wall opens between the annular clearance and the inside of the housing.

4. The device as claimed in claim 3, wherein the orifice is arranged in an upper part of the rotating machine above a level of the fluid when the shaft is in a horizontal position and the rotating machine is subject to no acceleration.

5. The device as claimed in claim 2, wherein the orifice passes through the fixed wall of the first labyrinth along an axial direction of the shaft.

6. The device as claimed in claim 1, wherein, in a flow path of the fluid, the second labyrinth has a pressure drop greater than that of the cavity.

7. The device as claimed in claim 1, wherein the fluid comprises oil.

8. The device as claimed in claim 1, wherein the rotating machine is an electric machine.

9. The device as claimed in claim 1, further comprising a baffle arranged between the housing and the shaft and situated downstream of the first labyrinth in a flow path of the fluid for preventing particles, which are presented in the air and surrounding the rotating machine, from entering the housing.

10. The device as claimed in claim 9, wherein the baffle comprises a channel between the fixing wall of the first labyrinth and the shaft, and the channel connecting the annular clearance.

11. The device as claimed in claim 1, wherein the fins are bar-shaped and spaced away from each other.

12. The device as claimed in claim 1, wherein each of the fins extends along the moving wall and radially outwardly from the shaft.

13. The device as claimed in claim 1, wherein
the first labyrinth further comprises a first ring continuously extending between the annular clearance and the cavity, and a second ring connecting with the annular clearance,
the fixed wall includes a first portion and a second portion,
the first ring is arranged between the first portion and the moving wall, and the second ring is arranged between the second portion and the moving wall, and
the fins are arranged in the second ring and facing toward the second portion of the fixed wall.

14. The device as claimed in claim 1, wherein the second labyrinth comprises a moving wall secured to the shaft and a fixed wall secured to the housing, and a ring provided between the moving wall and the fixed wall.

15. The device as claimed in claim 14, wherein the cavity connects with the ring of the second labyrinth and the annular clearance of the first labyrinth.

16. The device as claimed in claim 1, wherein the moving wall of the first labyrinth is a disk, and the fins are directly secured to the disk.

* * * * *